United States Patent
Marttinen et al.

(10) Patent No.: US 11,059,168 B2
(45) Date of Patent: Jul. 13, 2021

(54) AUTOMATICALLY POSITIONABLE JOINTS AND TRANSFER TOOLING ASSEMBLIES INCLUDING AUTOMATICALLY POSITIONABLE JOINTS

(71) Applicant: Norgren Automation Solutions, LLC, Saline, MI (US)

(72) Inventors: Edwin E. Marttinen, Pinckney, MI (US); Steven D. Koski, Ann Arbor, MI (US); Stephen E. Wikstrom, Ann Arbor, MI (US); Vincent C. Rabaut, III, Grosse Pointe, MI (US); Dale Lesh, Sterling Heights, MI (US); John David Begin, Chesterfield Township, MI (US)

(73) Assignee: Norgren Automation Solutions, LLC, Saline, MI (US)

( * ) Notice: Subject to any disclaimer, the term of this patent is extended or adjusted under 35 U.S.C. 154(b) by 198 days.

(21) Appl. No.: 16/129,024

(22) Filed: Sep. 12, 2018

(65) Prior Publication Data

US 2019/0009406 A1    Jan. 10, 2019

Related U.S. Application Data

(63) Continuation of application No. 14/867,245, filed on Sep. 28, 2015, now Pat. No. 10,124,486.

(60) Provisional application No. 62/056,098, filed on Sep. 26, 2014.

(51) Int. Cl.
*B25J 9/10*     (2006.01)
*B25J 15/00*    (2006.01)
(Continued)

(52) U.S. Cl.
CPC ............... *B25J 9/106* (2013.01); *B25J 9/02* (2013.01); *B25J 9/08* (2013.01); *B25J 9/126* (2013.01);
(Continued)

(58) Field of Classification Search
CPC .... F16D 7/027; F16D 25/0638; B25J 17/0208
See application file for complete search history.

(56) References Cited

U.S. PATENT DOCUMENTS

| 4,922,782 A | 5/1990 | Kawai |
| 5,975,264 A | 11/1999 | McCormick |

(Continued)

FOREIGN PATENT DOCUMENTS

| EP | 2617535 A2 | 7/2013 |
| JP | 2005127463 A | 5/2005 |

(Continued)

*Primary Examiner* — Terence Boes
(74) *Attorney, Agent, or Firm* — Young Basile Hanlon & MacFarlane, P.C.

(57) ABSTRACT

An automatically positionable joint for a modular tooling assembly includes a first joint member; a second joint member that is rotatably connected to the first joint member; a motor for causing rotation of the first joint member with respect to the second joint member; and a first clutch that is movable between an engaged position in which the first clutch restrains rotation of the first joint member with respect to the second joint member and a disengaged position in which the first clutch permits rotation of the first joint member with respect to the second joint member.

20 Claims, 10 Drawing Sheets

(51) Int. Cl.
*B25J 15/06* (2006.01)
*B25J 17/00* (2006.01)
*B25J 19/00* (2006.01)
*F16D 7/02* (2006.01)
*F16D 25/0638* (2006.01)
*B25J 9/02* (2006.01)
*B25J 9/08* (2006.01)
*B25J 9/12* (2006.01)

(52) U.S. Cl.
CPC ....... *B25J 15/0061* (2013.01); *B25J 15/0616* (2013.01); *B25J 17/00* (2013.01); *B25J 19/0004* (2013.01); *B25J 19/0091* (2013.01); *F16D 7/027* (2013.01); *F16D 25/0638* (2013.01); *Y10S 901/15* (2013.01); *Y10S 901/23* (2013.01); *Y10S 901/28* (2013.01)

(56) References Cited

U.S. PATENT DOCUMENTS

| | | | |
|---|---|---|---|
| 7,860,610 B2 | 12/2010 | Waldmann et al. | |
| 7,971,916 B2 | 7/2011 | Lin et al. | |
| 8,496,425 B2 | 7/2013 | Lin et al. | |
| 2003/0051960 A1* | 3/2003 | Li | F16D 7/027 192/28 |
| 2007/0164009 A1* | 7/2007 | Hesse | A61P 3/10 219/158 |
| 2008/0226427 A1* | 9/2008 | Van Zile | B25J 15/0061 414/14 |
| 2010/0065999 A1* | 3/2010 | Bereznicki | B25J 19/0004 269/59 |
| 2010/0140969 A1* | 6/2010 | Lin | B25J 15/0061 294/86.4 |
| 2011/0029133 A1 | 2/2011 | Okazaki et al. | |
| 2012/0089254 A1 | 4/2012 | Shafer et al. | |
| 2013/0306425 A1* | 11/2013 | Clesceri | F16D 7/027 192/56.1 |
| 2014/0008928 A1 | 1/2014 | Collado Jimenez et al. | |

FOREIGN PATENT DOCUMENTS

| | | |
|---|---|---|
| JP | 2011183474 A | 9/2011 |
| JP | 49-12357 B2 | 4/2012 |
| JP | 2013146820 A | 8/2013 |
| WO | 2012163390 A1 | 12/2012 |

* cited by examiner

AUTOMATICALLY POSITIONABLE JOINTS AND TRANSFER TOOLING ASSEMBLIES INCLUDING AUTOMATICALLY POSITIONABLE JOINTS

CROSS-REFERENCE TO RELATED APPLICATIONS

This application is a continuation of U.S. patent application Ser. No. 14/867,245, filed on Sep. 28, 2015, which claims the benefit of U.S. Provisional Application No. 62/056,098, filed on Sep. 26, 2014.

BACKGROUND

Automated manipulators such as robotic arms typically utilize tooling assemblies with end effectors to pick up and release workpieces. Previous tooling assemblies have utilized various sections of tubing interconnected by brackets, mounts, clamps, and other similar devices. These brackets, mounts, and clamps allow positional adjustment of the sections of tubing such that a desired position and orientation can be established for an end effector. Because it is time consuming to change the configuration of the tooling assemblies, end effector tooling assemblies are often provided with a quick disconnect coupling or similar device. This allows the tooling assembly to be removed from the automated manipulator and replaced with a different tooling assembly. This is done, for example, to allow various different workpieces to be handled by the automated manipulator upon changing the tooling assembly.

SUMMARY

Automatically positionable joints and transfer tooling assemblies that include automatically positionable joints are disclosed herein.

One aspect of the disclosed embodiments is an automatically positionable joint for a modular tooling assembly. The automatically positionable joint includes a first joint member; a second joint member that is rotatably connected to the first joint member; a motor for causing rotation of the first joint member with respect to the second joint member; and a first clutch that is movable between an engaged position in which the first clutch restrains rotation of the first joint member with respect to the second joint member and a disengaged position in which the first clutch permits rotation of the first joint member with respect to the second joint member.

Another aspect of the disclosed embodiments is a modular tooling assembly that includes a first automatically positionable joint and a second automatically positionable joint. The first automatically positionable joint and the second automatically positionable joint each include a first joint member, a second joint member that is rotatably connected to the first joint member, a motor for causing rotation of the first joint member with respect to the second joint member, and a first clutch. The first clutch is movable between an engaged position in which the first clutch restrains rotation of the first joint member with respect to the second joint member and a disengaged position in which the first clutch permits rotation of the first joint member with respect to the second joint member. The modular tooling assembly also includes one or more tooling arm portions that rigidly connect the first automatically positionable joint to the second automatically positionable joint.

Another aspect of the disclosed embodiment is a modular tooling assembly that includes a first automatically positionable joint that includes a first joint member, a second joint member, a motor for causing rotation of the first joint member with respect to the second joint member on a first axis, wherein the first joint member is clutched with respect to the second joint member to permit rotation by the motor and to restrain rotation in response to external forces; a second automatically positionable joint that includes a third joint portion, a fourth joint portion, a motor for causing rotation of the third joint portion with respect to the fourth joint portion on a second axis, wherein the third joint portion is clutched with respect to the fourth joint portion to permit rotation by the motor and to restrain rotation in response to external forces; and one or more tooling arm portions that rigidly connects the first automatically positionable joint to the second automatically positionable joint.

BRIEF DESCRIPTION OF THE DRAWINGS

The various other uses of the present invention will become more apparent by referring to the following detailed description and drawings in which.

DETAILED DESCRIPTION

The description herein is directed to tooling assemblies that include automatically positionable joints. These tooling assemblies are utilized for applications that require tools such as end effectors to be positioned accurately at a predetermined position and held rigidly over a large number of operation cycles so that the tool is placed with a high degree of precision. The joints described herein are automatically positioned using a motor that is associated with each joint. Since the joints are then kept in the same position for a number of operation cycles, the joints each include a releasable clutch that is disengaged to allow adjustment of the joint using its motor, and then engaged to prevent movement at the joint in between adjustments to its position.

Figure 1:
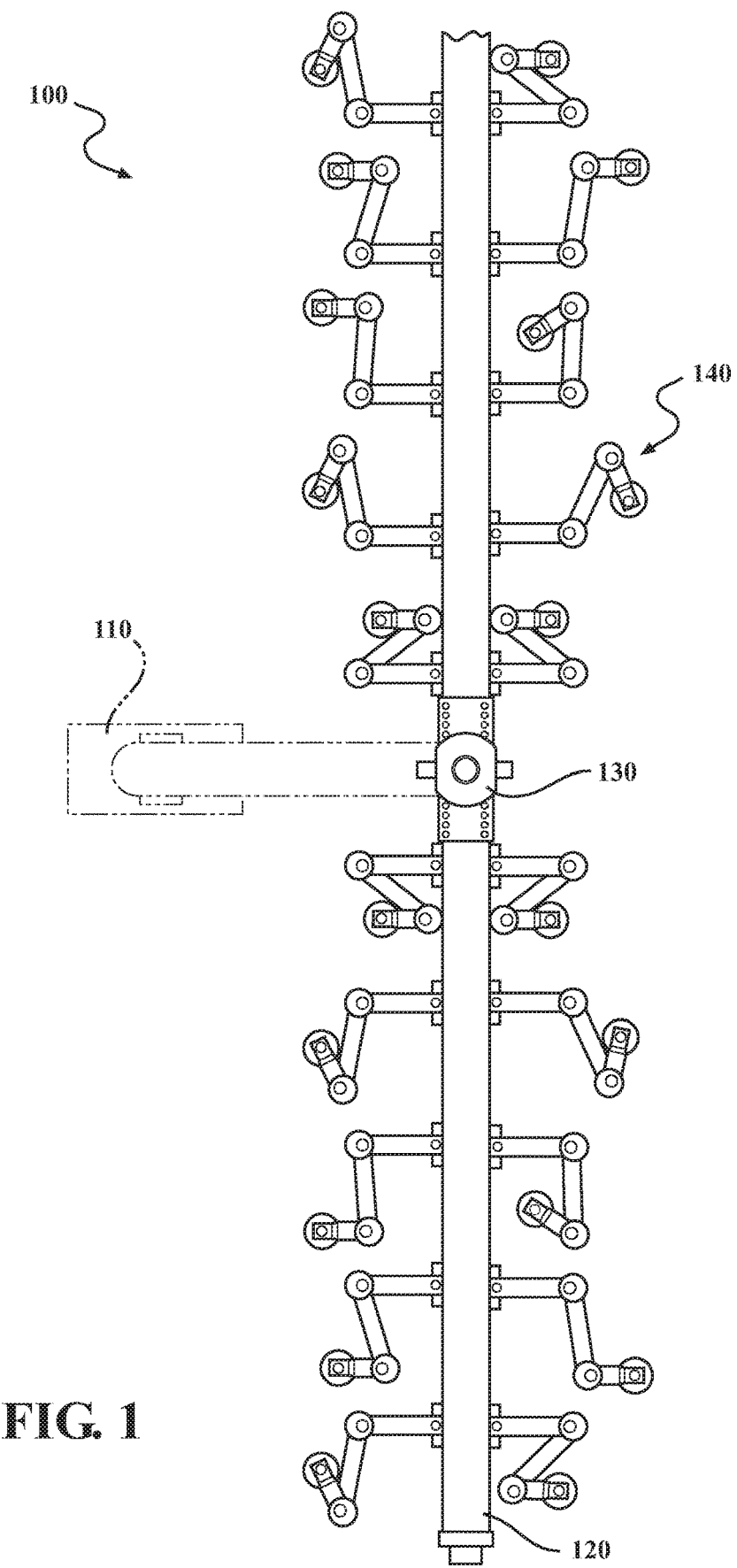
FIG. 1 is a top view of a transfer tooling assembly.

FIG. 1 shows a workpiece transfer system 100 that includes a robotic manipulator 110, a beam 120 that is coupled to the robotic manipulator 110 at a connector 130, and a plurality of automated tooling arms 140.

The workpiece transfer system 100 is typically utilized to perform a transfer operation in which a workpiece is moved from a first position to a second position. After moving the workpiece to the second position, the workpiece transfer system returns to the first position to repeat the transfer operation with respect to the next workpiece. For example, the first position could be at a first machine that performs a first operation with respect to the workpiece, and the second position could be at a second machine that performs a second operation with respect to the workpiece. During the transfer operation, the robotic manipulator 110 moves the beam and the automated tooling arms. There is no relative motion, however, of any of the automated tooling arms 140, either with respect to each other or with respect to the beam 120.

The beam 120 is a substantially rigid elongate member. In some implementations, the beam 120 is a linear member that is free from joints or couplings along its length. The robotic manipulator 110 is connected to the beam for moving the beam 120 in two or more degrees of freedom. In some implementations, the robotic manipulator 110 can be connected to and released from the beam 120 at the connector 130, with the connector 130 being a quick-release style connection that provides mechanical, electrical, and/or pneumatic connection of the beam 120 with respect to the robotic manipulator 110. In other implementations, the robotic manipulator 110 is permanently connected to the beam 120 at the connector 130 by any suitable rigid fastening structure. Using the robotic manipulator 110, the beam 120 and all of the automated tooling arms 140 that are connected to the beam 120 can be moved in unison.

Each of the automated tooling arms 140 is connected to the beam 120 at a fixed location on the beam. Connection of the tooling arms 140 to the beam 120 can be accomplished using any suitable rigid fastening structure or a quick connect structure that is operable to accurately position and precisely hold the tooling arms 140 in a desired position with respect to the beam 120.

The automated tooling arms 140 are positioned in a desired configuration with respect to the beam 120, with the configuration being dependent upon the geometry of the workpieces that are being handled by the workpiece transfer system 100. In a typical application, a large number of cycles of the transfer operation will be performed with respect to a single type of workpiece, with each of the individual workpieces of a certain type having a certain geometry. When the need arises to utilize the workpiece transfer system 100 in conjunction with a different type of workpiece having a geometry that differs from the geometry of the workpiece that was previously being processed, the configurations of some or all of the automated tooling arms 140 can be changed so that they adopt a configuration that is suited for use with the next type of workpiece.

Figure 2:
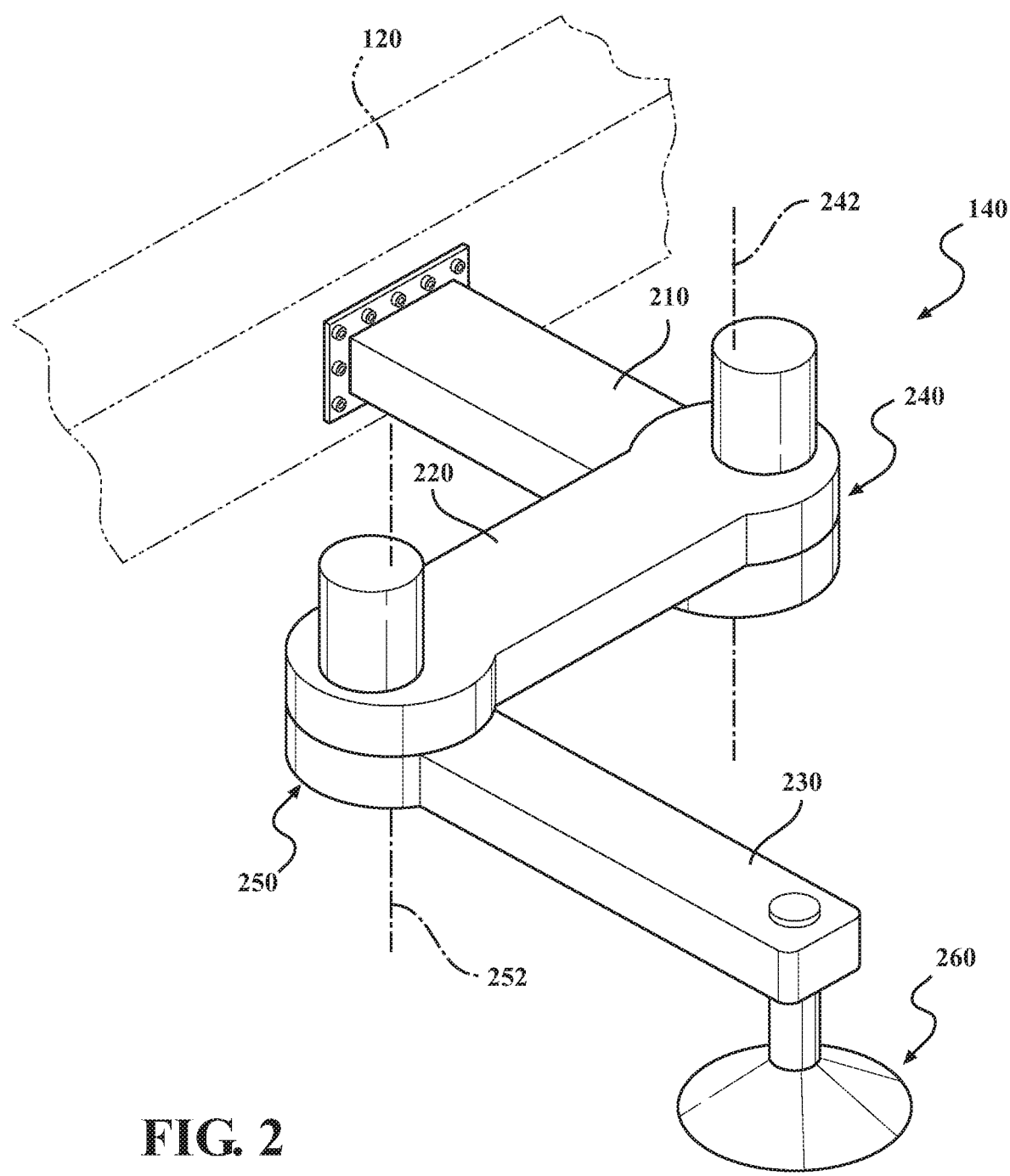
FIG. 2 is a perspective view of a tooling arm of a transfer tooling assembly.
Figure 3:
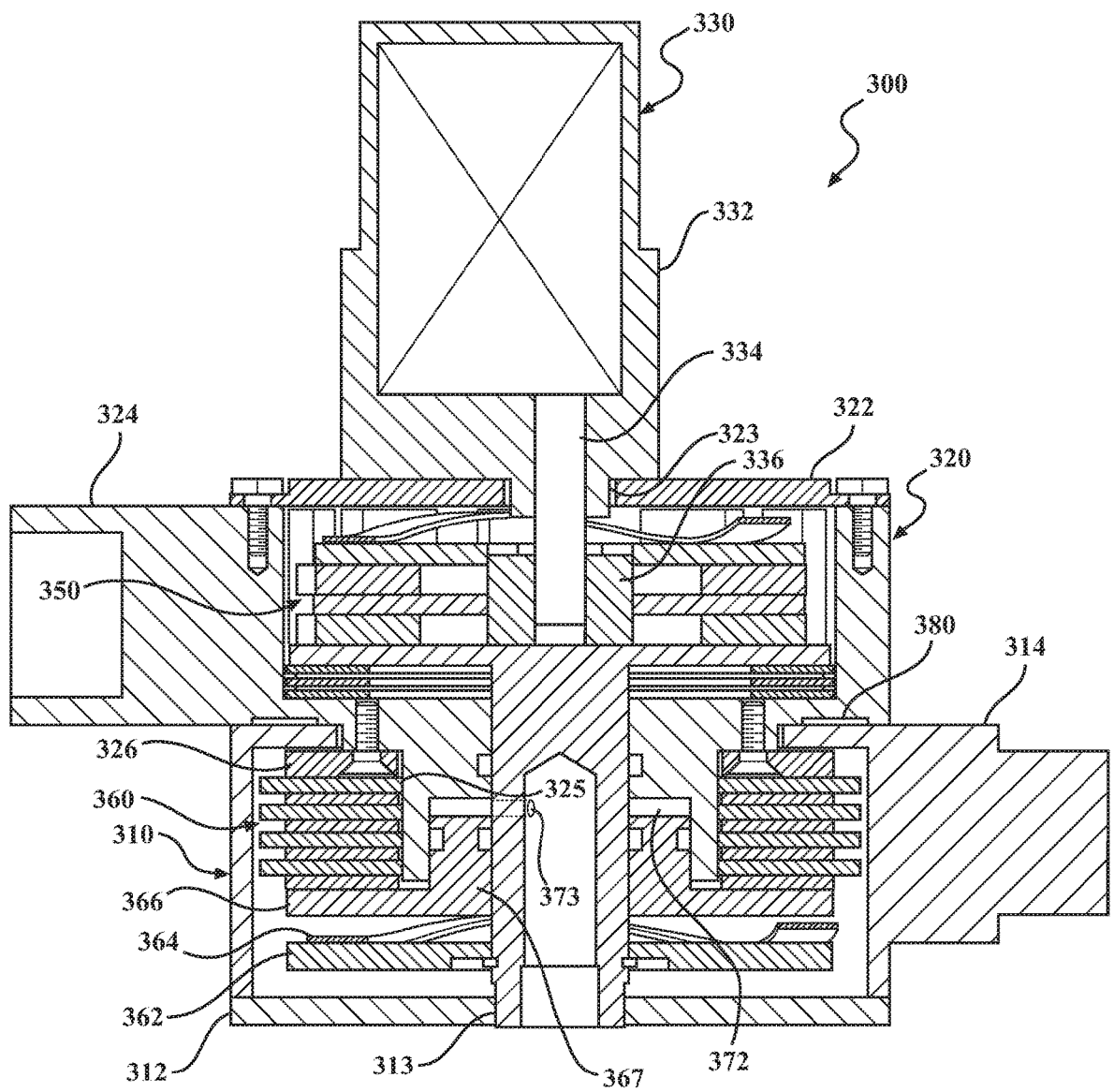
FIG. 3 is a cross-section view of an automatically positionable joint according to a first example.
Figure 4:
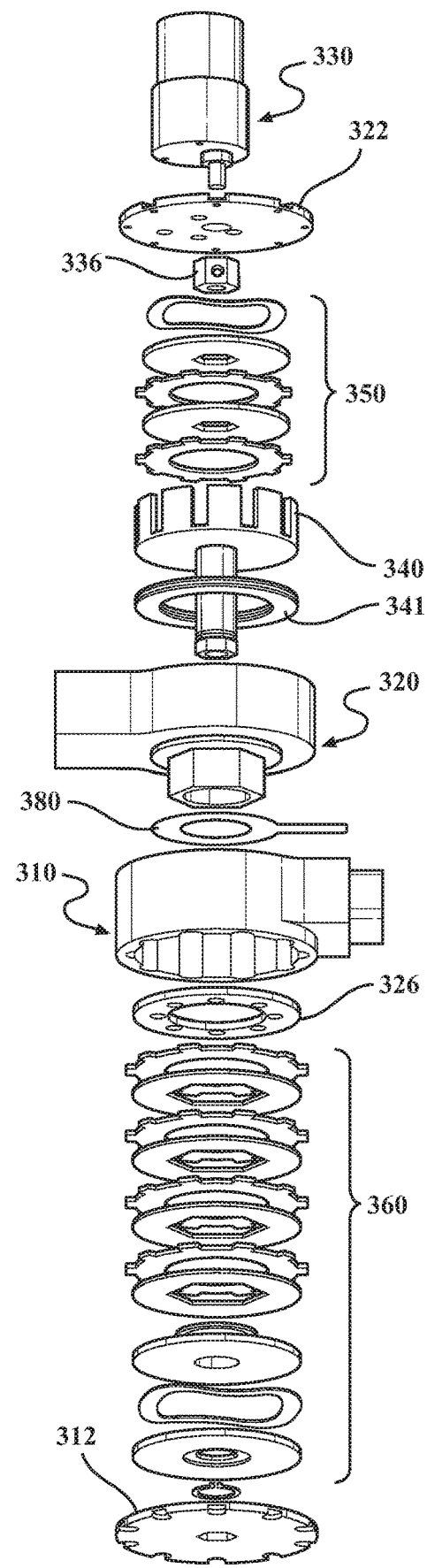
FIG. 4 is an exploded perspective view of the automatically positionable joint of FIG. 3.
Figure 5:
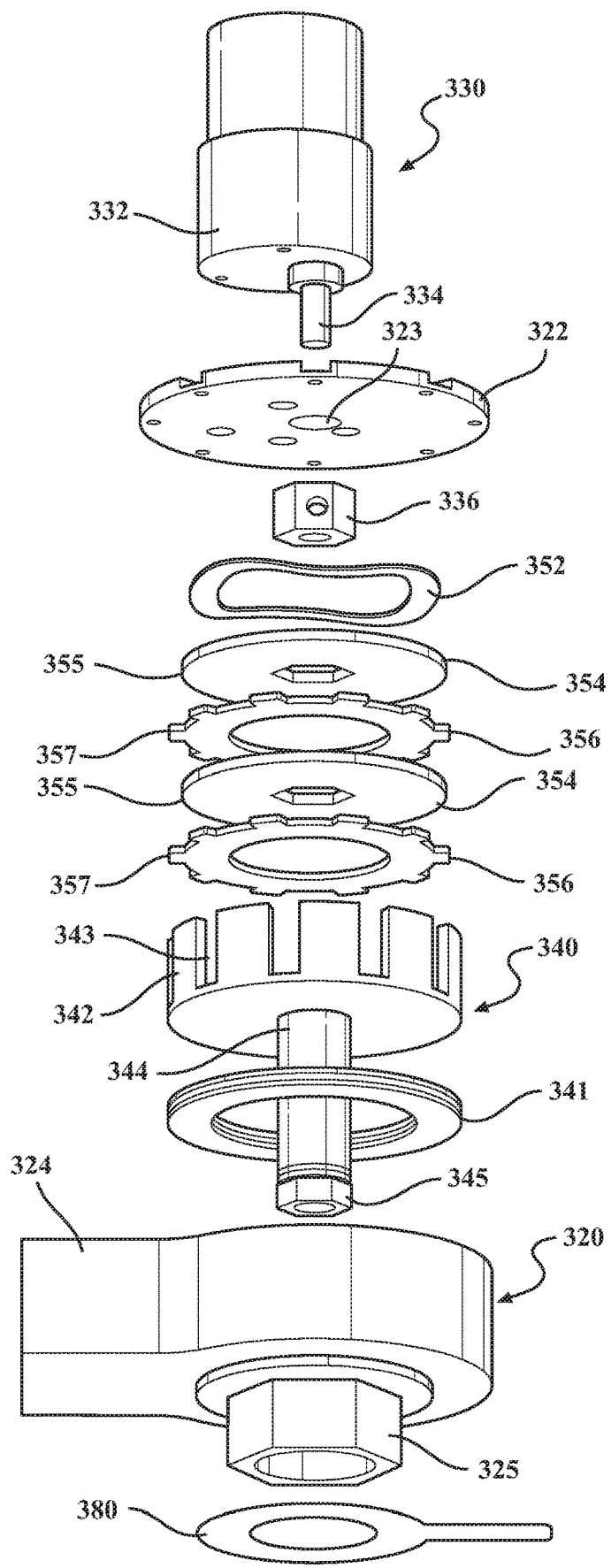
FIG. 5 is a detail view showing part of the automatically positionable joint of FIG. 3.
Figure 6:
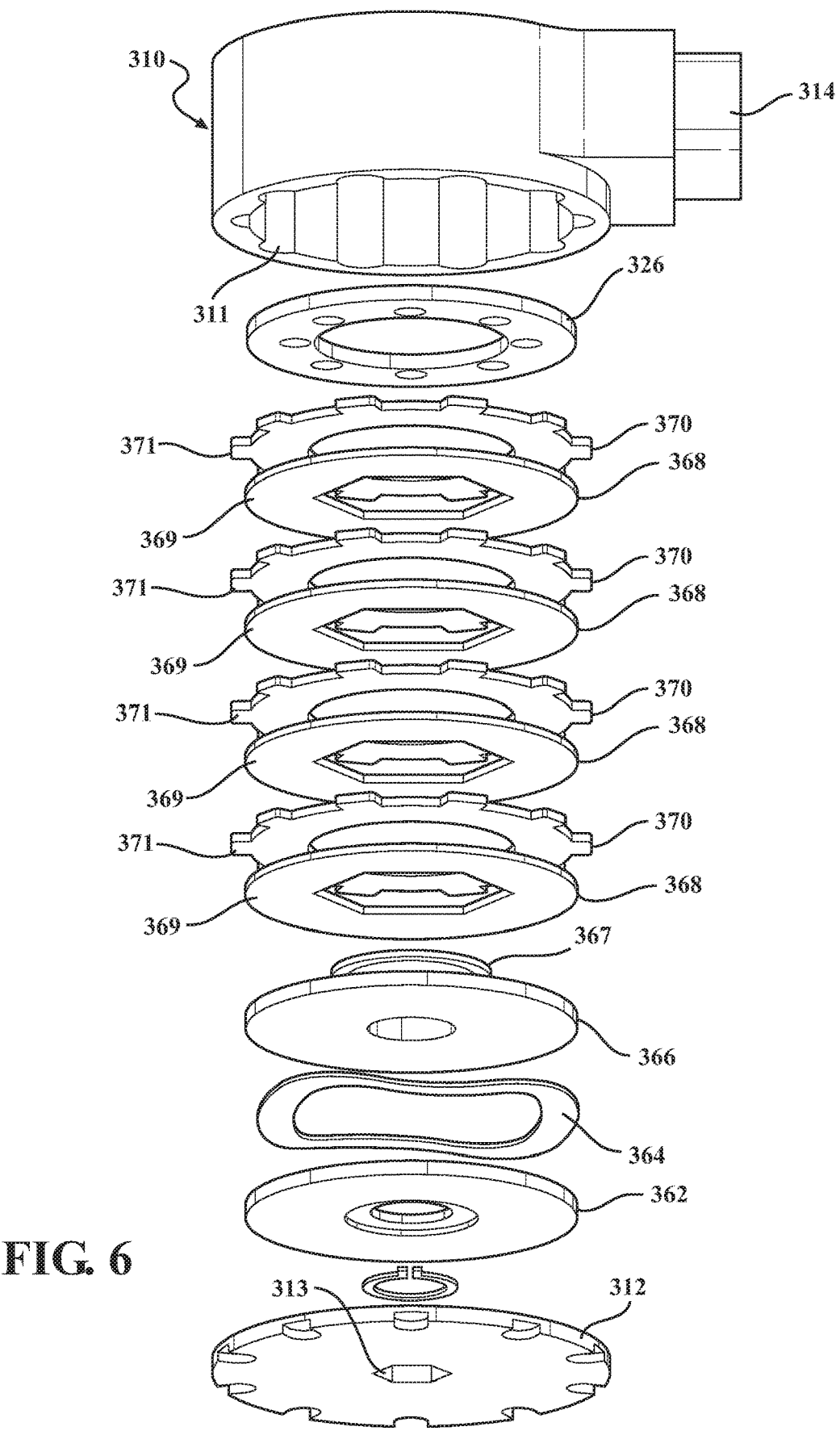
FIG. 6 is a detail view showing part of the automatically positionable joint of FIG. 3.

As shown in FIG. 2, each of the automated tooling arms 140 includes one or more tooling arm portions such as a first arm portion 210, a second arm portion 220, and a third arm portion 230. The tooling arm portions are all rigid, elongate members that are interconnected by one or more automatically positionable joints, such as a first joint 240 and a second joint 250. In the illustrated example, the first arm portion 210 is connected to the second arm portion 220 by the first joint 240, and the second arm portion 220 is connected to the third arm portion 230 by the second joint 250. The first joint 240 is operable to cause rotation about a first axis 242. In particular, the first joint 240 can be automatically adjusted to a desired position which causes the second arm portion 220 to rotate with respect to the first arm portion 210 about the first axis 242. This adjustment necessarily moves the third arm portion 230 as well. The second joint 250 is operable to cause rotation about a second axis 252. In particular, the second joint 250 can be automatically adjusted to a desired position, which causes the third arm portion 230 to rotate with respect to the second arm portion 220 about the second axis 252.

An end effector 260 is connected to the third arm portion 230, opposite the second joint 250. The end effector 260 is adapted to engage a workpiece. The end effectors 260 of multiple tooling arms 140 engage the workpiece at the same time during the transfer operation, thereby allowing the workpiece transfer system 100 to pick up and move the workpiece. In the illustrated example, the end effector 260 is a vacuum cup. Other types of end effectors can be utilized, such as grippers, magnets, and shovels.

FIGS. 3-6 show an automatically positionable joint 300 according to a first example. The automatically positionable joint 300 can be utilized as the first joint 240 and/or the second joint 250 of the automated tooling arm 140 of FIG. 2. The joint 300 includes a first joint member that is rotatable with respect to a second joint member.

The first joint member of the joint 300 can be defined by a first housing 310 and an end plate 312. The first housing 310 defines a hollow interior for receiving and containing components of the joint 300 as will be described further herein. In some implementations, the hollow interior of the first housing 310 is cylindrical or substantially cylindrical, either in whole or in part. The first housing 310 includes an integrally formed tooling arm portion 314 for connection to other tooling arm portions, joints, or tools. In other implementations, a complete tooling arm and, optionally, a housing of another joint can be integrally formed with the first housing 310. In yet other implementations, a separate tooling arm portion is connectable to the first housing 310 by any manner of coupling or fastener.

The end plate 312 is a planar circular member that is rigidly connected to an open end of the first housing 310 opposite the second joint member by conventional structures such as threaded fasteners that are operable to prevent rotation of the end plate 312 with respect to the first housing 310. This allows the end plate 312 to receive a rotational drive force at a drive aperture 313, which in this example is a non-round (e.g. hexagonal) aperture that is formed at a radial center of the end plate 312 and is positioned along and extends along an axis of rotation of the first joint member with respect to the second joint member.

The second joint member of the joint 300 can be defined by a second housing 320, an end plate 322, and a retainer ring 326. The second housing 320 defines a hollow interior for receiving and containing components of the joint 300 as will be described further herein. In some implementations, the hollow interior of the second housing 320 is cylindrical or substantially cylindrical, either in whole or in part. The second housing 320 includes an integrally formed tooling arm portion 324 for connection to other tooling arm portions, joints, or tools. In other implementations, a complete tooling arm and, optionally, a housing of another joint can be integrally formed with the second housing 320. In yet other implementations, a separate tooling arm portion is connectable to the second housing 320 by any manner of coupling or fastener.

The second housing 320 also includes an integrally formed engagement surface 325 for receiving the first housing 310 that is positioned along and extends along the axis of rotation of the first joint member with respect to the second joint member. The engagement surface 325 is formed on and can extend around the outer periphery of the housing 320. In this example, the engagement surface 325 defines a polygonal periphery for the housing 320, with the polygonal periphery being centered on the axis of rotation, such that a polygonal cross section for the housing 320 is defined in the area of the engagement surface 325, when viewed in a direction that is parallel to the axis of rotation. Other geometries can be utilized.

The end plate 322 is a planar circular member that is rigidly connected to an open end of the second housing 320 opposite the first joint member by conventional structures such as threaded fasteners that are operable to prevent rotation of the end plate 322 with respect to the second housing 320. An aperture 323 is formed through the end plate 322. In this example, the aperture 323 is positioned along and extends along the axis of rotation of the first joint member with respect to the second joint member.

The retainer ring 326 is rigidly connected to the housing 320 by securing structures such as conventional threaded fasteners. The retainer ring 326 is configured with respect to the housing 320 to define an annular channel in which part of the housing 310 is received. This connection is configured such that the first housing 310 and the second housing 320 are rotatable with respect to one another, but cannot be separated or moved axially by a significant distance while the retainer ring 326 is connected to the second housing 320.

To drive rotation of the first joint member with respect to the second joint member, the joint 300 includes a motor 330. The motor 330 includes a motor housing 332 and an output shaft 334. The motor 330 is operable to receive an input signal and rotate the output shaft 334 by a desired degree of rotation in response to the input signal. In another implementation, the motor 330 can be an electrical motor that does not include gear reduction, and a gear train can be provided separately, such as inside the second housing 320.

The motor housing 332 is fixedly connected to the second joint member in a manner that prevents relative rotation of the motor housing 332 with respect to the second joint member. For example, the motor housing 332 can be rigidly connected to the end plate 322 with threaded fasteners or other conventional fasteners. The output shaft 334 extends through the aperture 323 of the end plate 322. A hub 336 is connected to the output shaft 334. In this implementation, the hub has an inner bore for receiving the output shaft 334, which is retained by conventional means such as a hex screw that is threaded to the hub along a passage perpendicular to the inner bore to allow engagement and disengagement with the output shaft in response to threaded advancement and retraction of the hex screw. The outer periphery of the hub 336 includes features that are intended to allow engagement of the hub to drive rotation of another structure, which in the implementation are flat surfaces as part of a polygonal (e.g. hexagonal) periphery.

The output shaft 334 of the motor is connected to a drive member 340 via a clutch assembly 350. The drive member 340 is disposed in the second housing 320 and a bearing 341.

The clutch assembly 350 is a non-actuated clutch that serves to limit the amount of torque that can be transmitted from the drive member 340 to the motor. For example, the clutch assembly 350 can be configured to slip (and thus not transmit rotation) when the torque applied to the clutch assembly 350 meets or exceeds a predetermined amount of torque. This can prevent damage to the motor 330 as a result of external forces applied to the tooling arm (e.g. a "tool crash").

The clutch assembly 350 is housed within a cylindrical portion 342 of the drive member 340. The cylindrical portion 342 is in the form of a cylindrical wall that includes geometric features that are adapted to engage the clutch assembly so that the drive member 340 can be driven by the clutch assembly 350. In the illustrated example, the drive member 340 has a plurality of axially extending slots 343 that extend from one end (an open end) of the cylindrical portion 342 part way down the cylindrical wall. Portions of the clutch assembly 350 are received in these slots, as will be explained.

The clutch assembly 350 includes a biasing element 352, a first plurality of clutch disks 354, and a second plurality of clutch disks 356. The first plurality of clutch disks 354 and the second plurality of clutch disks 356 are stacked in an interleaved manner. The biasing element 352 is positioned between the clutch disks 354, 356 and the end plate 322 in order to apply pressure to the clutch disks, thereby increasing frictional engagement between the first plurality of clutch disks 354 and the second plurality of clutch disks 356. Each of the clutch disks 354 has a drive aperture 355 that is adapted to engage the hub 336. As a result of engagement of the hub 336 with the drive aperture 355, the clutch disks 354 rotate in unison with the output shaft 334 of the motor 330. In one implementation, the clutch disks 354 are fabricated from metal. Other materials can be used. Each of the clutch disks 356 has a plurality of engagement structures 357 such as fingers that extend into the slots 343 of the drive member 340. As a result of engagement of the engagement structures 357 with the slots 343, the clutch disks 356 rotate in unison with the drive member 340. In one implementation, the clutch disks 354 are fabricated from a high friction material such as an organic material. Other materials can be used.

The torque applied to the clutch disks 354 by the motor 330 is, under normal and expected operating conditions, below the threshold torque value that the clutch assembly 350 is intended to accommodate, and thus, rotation of the output shaft of the motor will cause rotation of the drive member 340 via the clutch assembly 350. If, however, torque is applied to the clutch assembly 350 by the drive member 340, the clutch assembly 350 will slip if the torque applied to the clutch disks 356 by the drive member 340 exceeds a predetermined value to prevent rotation of the output shaft 334 of the motor 330. The predetermined value is a function of the sizes and materials selected for the clutch disks 354, 356, as well as the amount of force applied to the clutch disks 354, 356 by the biasing element 352, and is set based on characteristics of the motor 330.

The drive member 340 includes a drive shaft 344 that extends into the first housing 310. At an end of the drive shaft 344, an engaging structure 345 is defined on the outer periphery of the drive shaft 344. In this example, the engaging structure 345 has a geometric configuration that is complementary to the geometric configuration of the drive aperture 313, and the engaging structure 345 is disposed in the drive aperture 313 such that motion of the end plate 312 and the first housing 310 with respect to the drive member 340 is restrained.

A releasable clutch assembly 360 is disposed within the housing 310. The releasable clutch assembly 360 is movable between an engaged position in which the releasable clutch assembly 360 restrains rotation of the first joint member with respect to the second joint member and a disengaged position in which the releasable clutch assembly 360 permits rotation of the first joint member with respect to the second joint member. The releasable clutch assembly 360 is actuatable to cause movement of the releasable clutch assembly 360 between the engaged position and the disengaged position. For example, the releasable clutch assembly 360 can be a pneumatically operated clutch that is actuatable by a supply of pressurized air, with the releasable clutch assembly 360 being biased toward the engaged position and movable to the disengaged position in response to the supply of pressurized air.

The releasable clutch assembly includes a back plate 362, a biasing element 364 such as a wave spring, a pressure plate 366 with a collar portion 367, a first plurality of clutch disks 368, and a second plurality of clutch disks 370. The back plate 362 is a circular member that is seated on the drive shaft 344. The pressure plate 366 is also seated on the drive shaft 344, with the biasing element 364 positioned between the back plate 362 and the pressure plate 366 to bias the pressure plate toward the clutch disks 368, 370 to cause frictional engagement of the first plurality of clutch disks 368 with respect to the second plurality of clutch disks 370. An inner periphery 369 of each of the clutch disks 368 is received on the engagement surface 325 of the second housing 320 such that relative rotation of the second housing 320 and the clutch disks 368 is restrained. Engagement structures such as fingers 371 on the clutch disks 370 and grooves 311 on the inner periphery of the first housing 310 engage each other to prevent relative rotation of the first housing 310 and the clutch disks 370, with the clutch assembly in the engaged position by virtue of the biasing element compressing the clutch disks 368, 370 to frictionally engage them. The second housing 320 is restrained from rotating with respect to the first housing 310 unless subjected to an external force that overcomes the engagement of the clutch disks 368, 370.

The releasable clutch assembly 360 remains in the engaged position while the tooling arm in which the joint 300 is incorporated is in use, such as during repeated cycles of an operation (e.g. the previously described transfer operation). Prior to adjustment of the angular position of the second joint member with respect to the first joint member, the releasable clutch assembly 360 is moved to the disengaged position. The releasable clutch assembly 360 is moved to the disengaged position by releasing the pressure applied to the clutch disks 368, 370 by the pressure plate 366. In the illustrated example, the collar portion 367 is disposed in a chamber 372 that is defined between the second housing 320 and the drive shaft 344. In order to disengage the releasable clutch assembly, a supply of pressurized air is introduced to the chamber 372, such as via a supply port 373 that is connected to an external source of pressurized air. Air pressure in the chamber 372 moves the pressure plate toward the back plate 362 against the force of the biasing element 364. This releases the frictional engagement of the clutch disks 368, 370 so that the clutch disks 368 can rotate relative to the clutch disks 370 as the motor 330 drives adjustment of the second joint member with respect to the first joint member. Once the joint 300 has reached a desired angular configuration, the releasable clutch assembly 360 is moved to the engaged position by ending the supply of pressurized air to the chamber 372, thereby fixing the position of the first joint member with respect to the second joint member.

In order to determine the position of the first housing 310 relative to the second housing 320, the joint 300 includes an absolute encoder 380. The absolute encoder 380 is a device that directly senses the position of one structure with respect to another, without using relative measuring techniques such as calibrating to a datum and then measuring motion with respect to the datum. Thus, the position can be sensed by a motion controller (not shown) in order to drive operation of the motor 330 to set a desired angular orientation of the first joint member with respect to the second joint member. In the illustrated example, the absolute encoder is a flexible potentiometer, such as the FlexiPot Ring manufactured by Tekscan, Inc. of Boston, Mass. USA.

Other types of motors and control strategies can be usable to provide a motor that is operable to drive a desired degree of rotation of the first joint member with respect to the second joint member.

Figure 7:
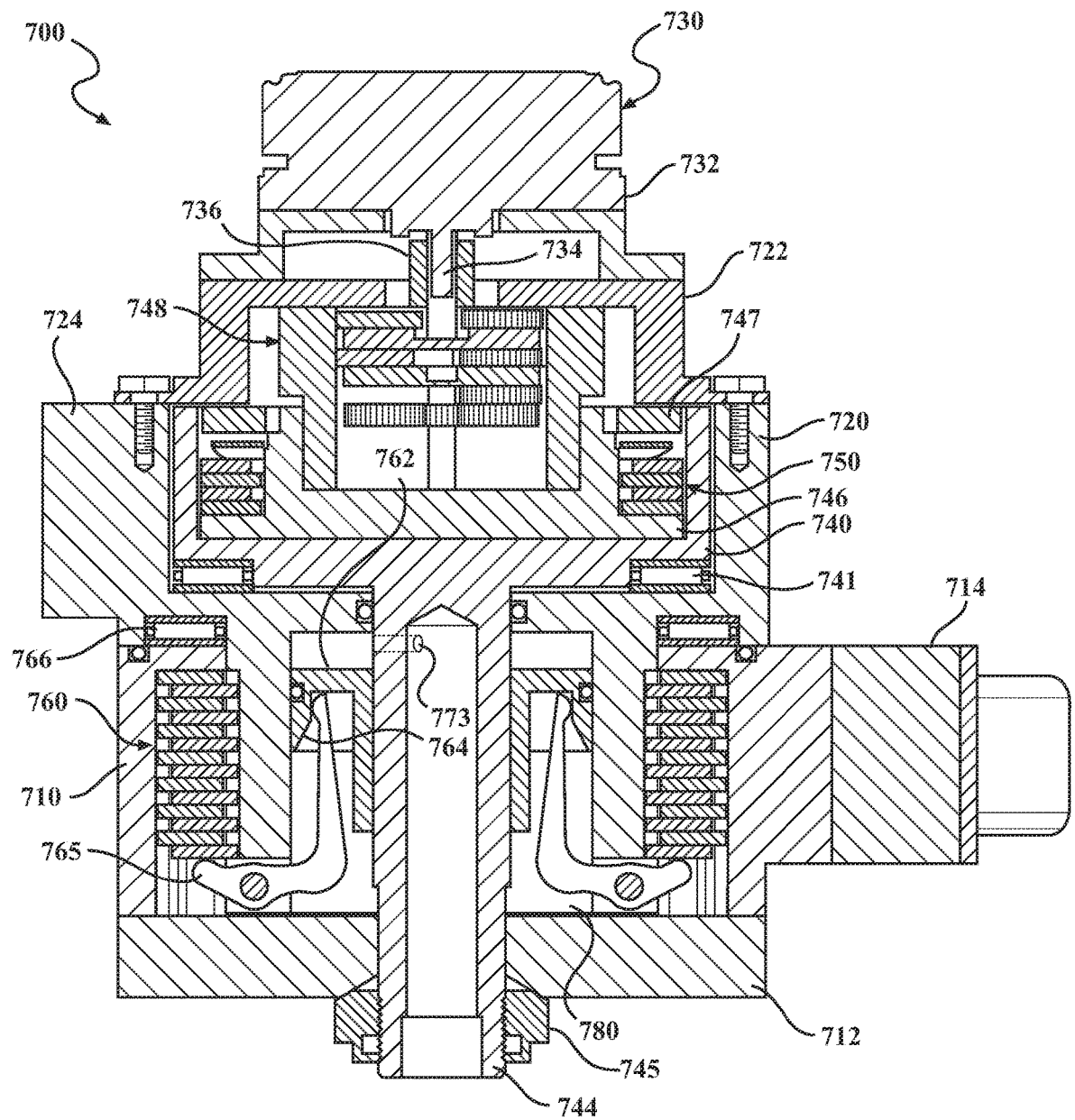
FIG. 7 is a cross-section view of an automatically positionable joint according to a second example.
Figure 8:
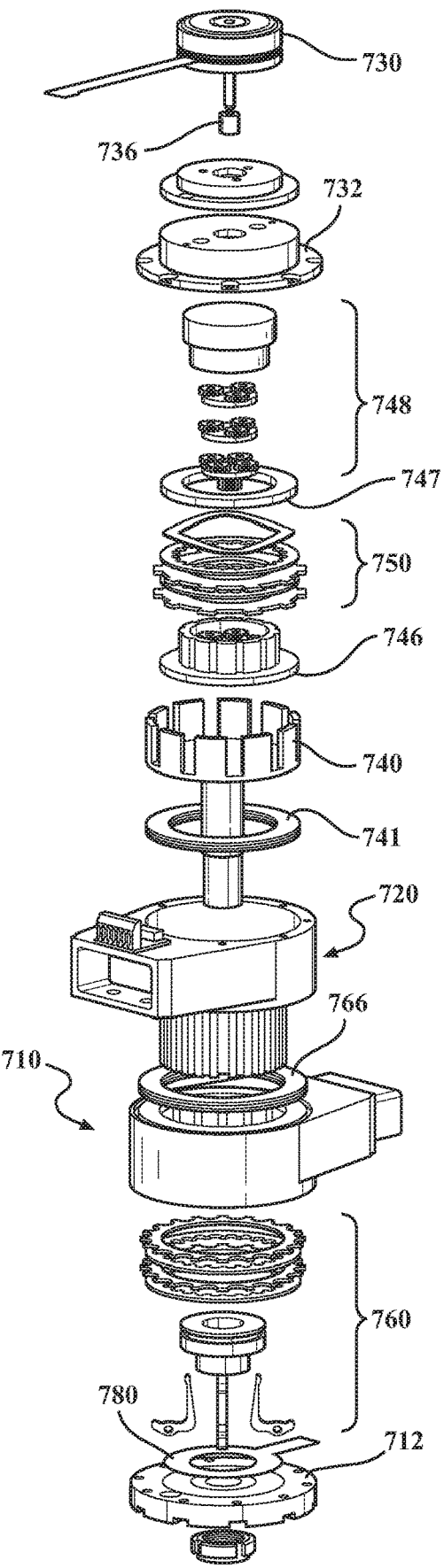
FIG. 8 is an exploded perspective view of the automatically positionable joint of FIG. 7.
Figure 9:
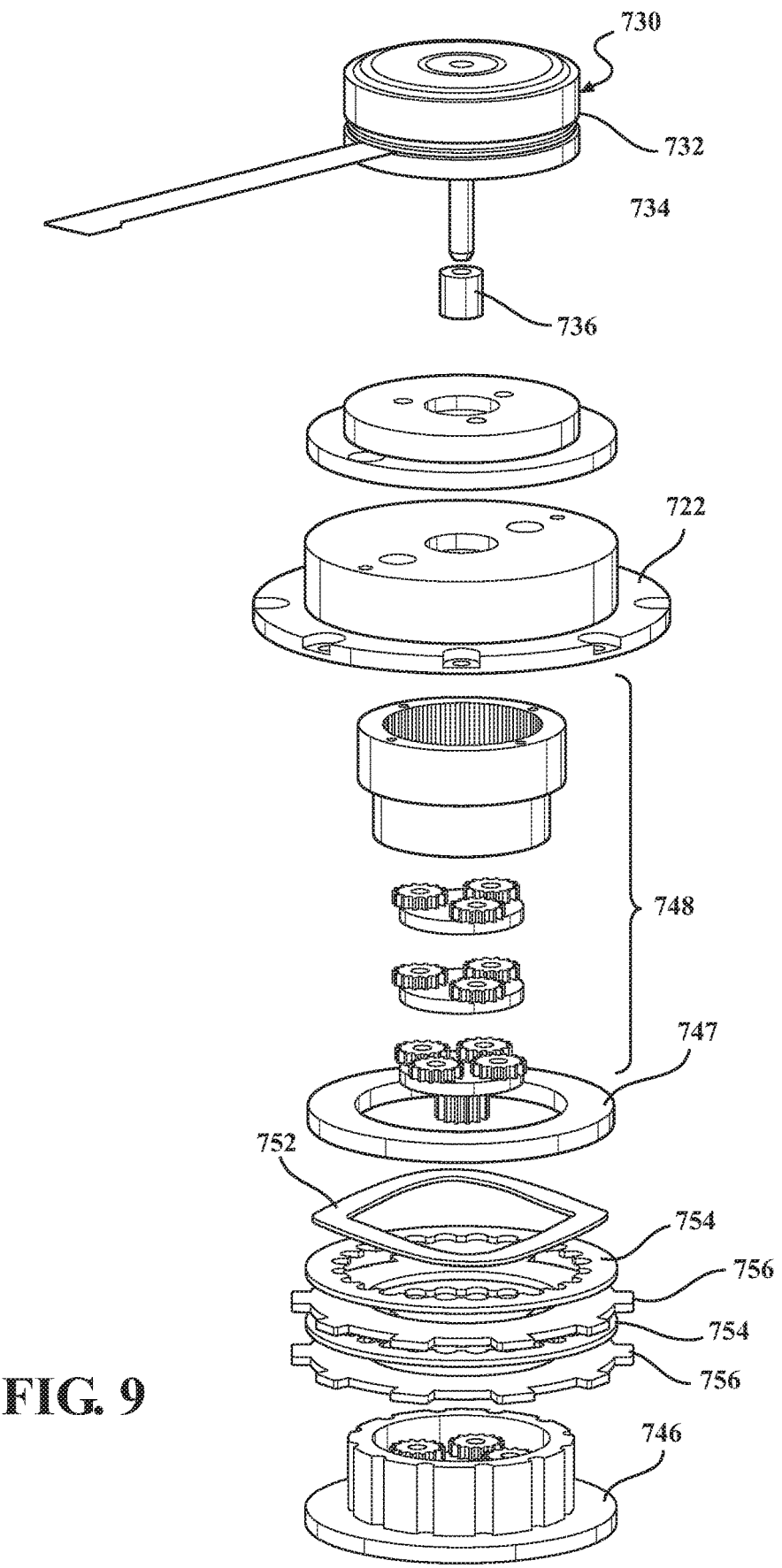
FIG. 9 is a detail view showing part of the automatically positionable joint of FIG. 7.
Figure 10:
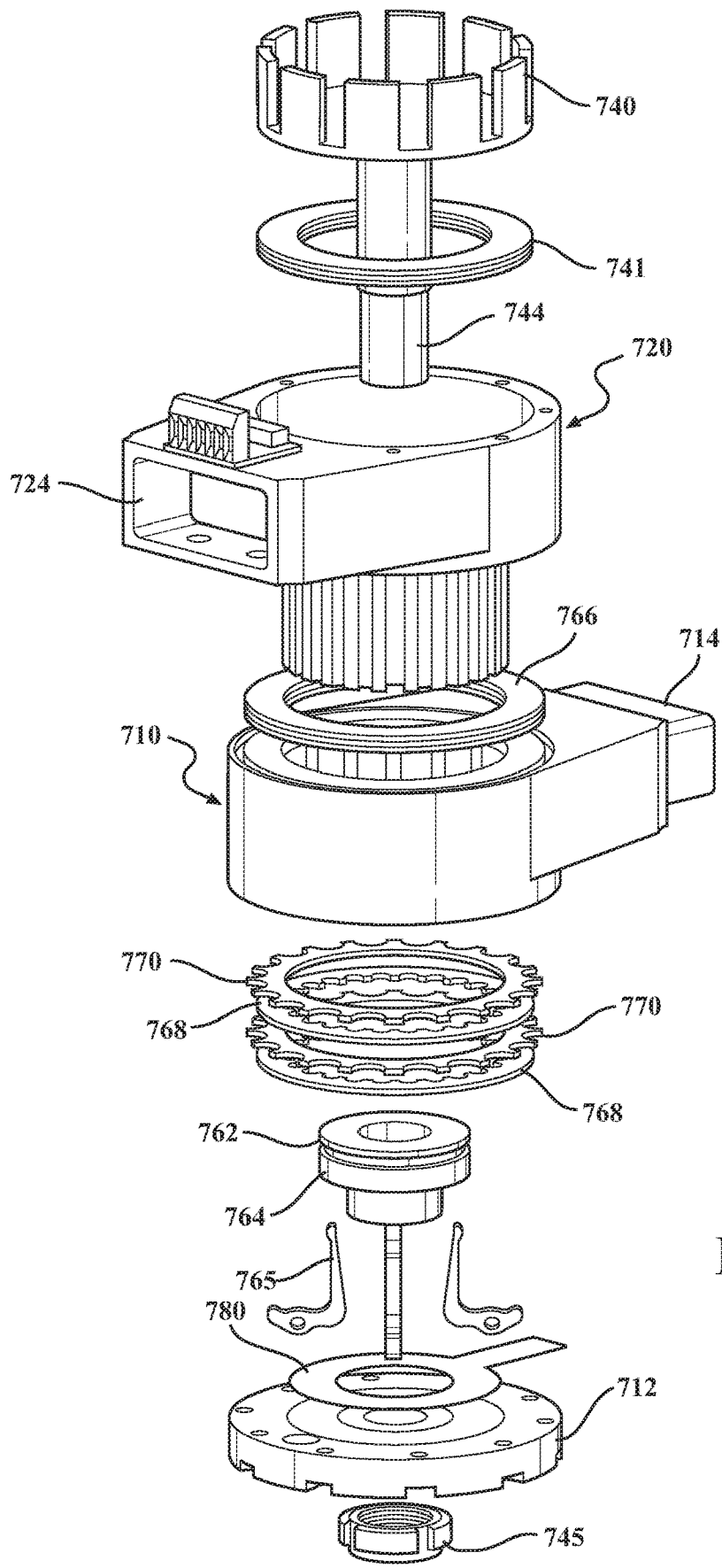
FIG. 10 is a detail view showing part of the automatically positionable joint of FIG. 7.

FIGS. 7-8 show an automatically positionable joint 700 according to a second example. The automatically positionable joint 700 can be utilized as the first joint 240 and/or the second joint 250 of the automated tooling arm 140 of FIG. 2. The joint 700 includes a first joint member that is rotatable with respect to a second joint member. The joint 700 is similar to the joint 300 and the description made with respect to the joint 300 applies to the joint 700 except as noted herein.

The first joint member of the joint 700 includes a first housing 710 with an end plate 712 and an integral tooling arm portion 714. The second joint member of the joint 700 includes a second housing 720 with an endplate 722 and an integral tooling arm portion 724. A motor 730 having a motor housing 732 and a drive shaft 734 is connectable to the joint 700 via the end plate 712. The drive shaft 734 drives a gear train 748 via a pinion 736. The gear train 748 reduces the speed and increases the torque of the rotational force provided by the motor 730. The gear train 748 causes rotation of a gear carrier 746. In the illustrated example, the gear train 748 is a planetary gear train. Other types of gear trains can be used. Alternatively, the gear train 748 can be omitted in favor of using a motor with internal gear reduction, as described with respect to the motor 330.

A drive member 740 and clutch assembly 750 are as described with respect to the drive member 340 and clutch assembly 350, with the clutch assembly 750 conducting torque below a predetermined level between the motor and the drive member 740. The clutch assembly includes a biasing element 752 and clutch disks 754, 756. The clutch assembly 750 receives rotational force from the motor 730 via the gear carrier 746, which rotates in unison with the clutch assembly 750 and drive member 740 below the predetermined torque level. A retainer ring 747 retains the clutch assembly 750 on the gear carrier 746 such that the clutch assembly 750 is captured between the gear carrier 746 and the retainer ring 747 to compress the disks of the clutch assembly 750. A bearing 741 facilitates rotation of the drive member 740 with respect to the second housing 720. A drive shaft 744 extends through the first housing 710 and is secured thereto by a fastener 745. An internal air passage in the drive shaft supplies pressurized air to the first joint member through a port 773. A bearing 766 facilitates rotation of the first housing 710 with respect to the second housing 720.

A releasable clutch assembly 760 is movable between an engaged position and a disengaged position such that it functions in the same manner as the releasable clutch assembly 360 of FIGS. 3-6, but with a different structural configuration. The releasable clutch assembly 760 includes a collar 762 that is seated on a shaft portion of the drive member 740. The collar 762 includes a wedge surface 764. A plurality of J-shaped levers 765 that are pivotally connected to the second housing 720 by pins and each have a first end engaged with the collar 762 and a second that applies pressure to a first plurality of clutch disks 768 and a second plurality of clutch disks 770 that restrain rotation of the first joint member with respect to the second joint member when engaged. Air pressure in the second housing from the port 773 forces the collar 762 downward to pivot the J-shaped levers 765 into engagement with the clutch which creates pressure in the clutch disks 768, 770, placing the releasable clutch assembly 760 in the engaged position.

In response to release of air pressure inside the second housing 720, the collar 762 slides upward, so that the wedge surface 764 no longer impedes pivoting of the J-shaped levers 765. The J-shaped levers 765 then pivot to release pressure on the clutch disks 768, 770, which places the releasable clutch assembly 760 in the released position, with relative rotation of the first joint member and the second joint member no longer being restrained.

The automatically positionable joint 700 includes an absolute encoder 780 positioned between the end plate 712 and the second housing 720. The absolute encoder 780 functions in the same manner as the absolute encoder 380.

While the invention has been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

The invention claimed is:

1. A joint for use in connecting arms of a tooling assembly to control relative movement between the arms, the joint comprising:
   a first plate;
   a biasing element positioned adjacent the first plate;
   a second plate positioned adjacent the biasing element such that the biasing element is positioned between the first and second plates; and
   a plurality of clutch disks movable between a first position, in which the plurality of clutch disks are in frictional engagement to inhibit relative movement between the arms of the tooling assembly, and a second position, in which the plurality of clutch disks are out of frictional engagement to allow relative movement between the arms of the tooling assembly.

2. The joint of claim 1, wherein the biasing element is configured as a spring that applies a biasing force to the second plate to bias the plurality of clutch disks towards the first position, the plurality of clutch disks including a plurality of first disks having a first configuration and a plurality of second disks having a second, different configuration, the plurality of clutch disks being arranged in a stack that alternates between first and second disks, wherein the joint defines an internal chamber configured to receive pressurized air such that the pressurized air acts on the second plate to move the second plate towards the first plate against the biasing force of the spring and thereby move the plurality of clutch disks from the first position into the second position.

3. The joint of claim 1, wherein the plurality of clutch disks includes:
   a plurality of first disks having a first configuration; and
   a plurality of second disks having a second, different configuration, the plurality of clutch disks being arranged in a stack that alternates between first and second disks.

4. The joint of claim 3, wherein the plurality of first disks are each annular in configuration and the plurality of second disks each include a plurality of projections extending outwardly therefrom in relation to a longitudinal axis of the joint.

5. The joint of claim 3, wherein the first and second plates are annular in configuration.

6. The joint of claim 3, wherein the first plate, the second plate, the plurality of clutch disks, and the biasing element are configured and arranged to allow the plurality of clutch disks to slip when torque applied to the plurality of clutch disks exceeds a predetermined threshold.

7. The joint of claim 3, wherein the second plate includes a collar portion extending therefrom along a longitudinal axis of the joint.

8. The joint of claim 3, wherein the biasing element is configured to apply a biasing force to the second plate to thereby bias the plurality of clutch disks towards the first position.

9. The joint of claim 8, wherein the biasing element is configured as a spring.

10. The joint of claim 9, wherein the biasing element is configured as a wave spring.

11. The joint of claim 8, wherein the joint defines an internal chamber configured to receive pressurized air such that the pressurized air acts on the second plate to move the second plate towards the first plate against the biasing force of the biasing element and thereby move the plurality of clutch disks from the first position into the second position.

12. A joint for use in connecting first and second arms of a tooling assembly to control relative movement between the first and second arms, the joint comprising:
   a first clutch assembly including:
      an end plate;
      a first biasing element in contact with the end plate; and
      a first plurality of clutch disks movable between a first position, in which the first plurality of clutch disks are in frictional engagement to allow rotational force transmission through the first plurality of clutch disks, and a second position, in which the first plurality of clutch disks are out of frictional engagement to disallow rotational force transmission through the first plurality of clutch disks; and
   a second clutch assembly spaced axially from the first clutch assembly along a longitudinal axis of the joint, the second clutch assembly including:
      a first plate;
      a second biasing element positioned adjacent the first plate;
      a second plate positioned adjacent the biasing element; and
      a second plurality of clutch disks movable between a first position, in which the second plurality of clutch disks are in frictional engagement to inhibit relative movement between the first and second arms of the tooling assembly, and a second position, in which the second plurality of clutch disks are out of frictional engagement to allow relative movement between the first and second arms of the tooling assembly.

13. The joint of claim 12, wherein the first plurality of clutch disks includes a plurality of first disks having a first configuration and a plurality of second disks having a second configuration different than the first configuration, the second plurality of clutch disks including a plurality of third disks having a third configuration and a plurality of fourth disks having a fourth configuration different than the third configuration.

14. The joint of claim 13, wherein the first plurality of clutch disks are arranged in a stack that alternates between first and second disks, and the second plurality of clutch disks are arranged in a stack that alternates between third and fourth disks.

15. The joint of claim 12, wherein the first biasing element is configured to apply a biasing force to the first plurality of clutch disks to thereby bias the first plurality of clutch disks towards the first position, and the second biasing element is configured to apply a biasing force to the second plate of the second clutch assembly to thereby bias the second plurality of clutch disks towards the first position.

16. The joint of claim 15, wherein the first and second biasing elements are configured as springs.

17. The joint of claim 16, wherein the first and second biasing elements are configured as wave springs.

18. The joint of claim 15, wherein the first clutch assembly is configured to selectively connect a motor to the first arm of the tooling assembly via positioning of the first plurality of clutch disks in the first position such that the motor acts upon the first arm.

19. The joint of claim 18, wherein the first clutch assembly is configured to slip when torque applied to the first plurality of clutch disks exceeds a predetermined threshold.

20. A tooling assembly, comprising:
   a first tooling portion including:
      a motor;
      a drive member selectively rotatable by the motor;
      a first clutch assembly configured to selectively connect the motor to the drive member such that actuation of the motor causes rotation of the drive member, the first clutch assembly including:
         an end plate;
         a first biasing element in contact with the end plate; and
         a first plurality of clutch disks, wherein the first plurality of clutch disks are movable into frictional engagement via pressure applied by the first biasing element to thereby transmit rotational force from the motor to the drive member to cause rotation of the drive member;
      a first housing configured to accommodate the drive member, the drive member being in engagement with the first housing such that rotation of the drive member causes corresponding rotation of the first housing; and
      a first tooling arm connected to the first housing such that rotation of the first housing causes movement of the first tooling arm; and
   a second tooling portion connected to the first tooling portion, the second tooling portion including:
      a second tooling arm;
      a second housing connected to the second tooling arm; and
      a second clutch assembly accommodated by the second housing, the second clutch assembly being movable between an engaged position, in which relative movement between the first and second tooling portions is restrained, and a disengaged position, in which relative movement between the first and second tooling portions is not restrained.

* * * * *